(12) United States Patent  
Brown

(10) Patent No.: US 9,162,167 B2  
(45) Date of Patent: Oct. 20, 2015

(54) SIMPLIFIED FILTER

(71) Applicant: Aquamira Technologies, Inc., Logan, UT (US)

(72) Inventor: Dennis B. Brown, Logan, UT (US)

(73) Assignee: AQUAMIRA TECHNOLOGIES, INC., Logan, UT (US)

( * ) Notice: Subject to any disclaimer, the term of this patent is extended or adjusted under 35 U.S.C. 154(b) by 94 days.

(21) Appl. No.: 13/776,240

(22) Filed: Feb. 25, 2013

(65) Prior Publication Data

US 2014/0069871 A1   Mar. 13, 2014

Related U.S. Application Data

(60) Provisional application No. 61/638,997, filed on Apr. 26, 2012.

(51) Int. Cl.  
    *B01D 29/58* (2006.01)  
    *B01J 20/28* (2006.01)  
    *B01D 29/11* (2006.01)  
    *B01D 15/10* (2006.01)

(52) U.S. Cl.  
    CPC ............... *B01D 29/58* (2013.01); *B01D 15/10* (2013.01); *B01D 29/111* (2013.01); *B01J 20/28014* (2013.01); *B01D 2201/295* (2013.01); *Y10T 156/1056* (2015.01)

(58) Field of Classification Search  
    USPC ...................................................... 210/510.1  
    See application file for complete search history.

(56) References Cited

U.S. PATENT DOCUMENTS

| | | | |
|---|---|---|---|
| 4,397,384 A | 8/1983 | Nohren, Jr. | 198/341 |
| 4,609,465 A | 9/1986 | Miller | 210/323.2 |
| 4,695,379 A | 9/1987 | Nohren, Jr. et al. | 210/282 |
| 4,769,144 A | 9/1988 | Nohren, Jr. | 210/282 |
| 4,886,599 A | 12/1989 | Bachmann et al. | 210/287 |
| 4,979,654 A | 12/1990 | Nohren, Jr. | 222/482 |
| 4,986,901 A | 1/1991 | Nohren, Jr. et al. | 210/85 |
| 5,045,195 A | 9/1991 | Spangrud et al. | 210/266 |
| 5,156,335 A | 10/1992 | Smith et al. | 239/33 |
| 5,211,973 A | 5/1993 | Nohren, Jr. | 426/82 |
| 5,609,759 A | 3/1997 | Nohren, Jr. et al. | 210/266 |
| 5,674,391 A | 10/1997 | Nohren, Jr. | 210/266 |
| 5,690,765 A * | 11/1997 | Stoyell et al. | 156/69 |
| 5,762,796 A * | 6/1998 | Zraik | 210/493.1 |
| 6,136,189 A | 10/2000 | Smith et al. | 210/266 |
| 6,165,362 A | 12/2000 | Nohren, Jr. et al. | 210/266 |
| 6,193,886 B1 | 2/2001 | Nohren, Jr. | 210/282 |
| 6,200,471 B1 | 3/2001 | Nohren, Jr. | 210/184 |
| 6,221,416 B1 | 4/2001 | Nohren, Jr. | 426/394 |
| 6,230,777 B1 * | 5/2001 | Hedlund et al. | 156/443 |

(Continued)

*Primary Examiner* — Chester Barry  
(74) *Attorney, Agent, or Firm* — Hayes Soloway P.C.

(57) ABSTRACT

A filter includes a structurally rigid adsorptive filtering medium formed as a sintered porous material chosen to remove targeted contaminant(s). The adsorptive filtering medium forms a hollow chamber sized to receive a mechanical filtering medium which is sized to press outward against the adsorptive filtering medium which supports the mechanical filtering medium thus eliminating a cage and a core to support the mechanical filtering medium and leading to a simplified construction. The fluid enters the filter through substantially the entire face of the adsorptive filtering structure and proceeds through the mechanical filtering medium which is a pleated paper filter. The hollow chamber may be capped at each end such that the caps effectively seal the filter and direct the fluid through the adsorptive filter medium and the mechanical filter medium.

20 Claims, 13 Drawing Sheets

(56) References Cited

U.S. PATENT DOCUMENTS

| | | | |
|---|---|---|---|
| 6,238,560 B1 | 5/2001 | Gershenson | 210/342 |
| 6,739,459 B1 * | 5/2004 | Hartmann | 210/457 |
| 7,112,272 B2 | 9/2006 | Hughes et al. | 210/45.1 |
| 7,473,362 B1 | 1/2009 | Nohren, Jr. | 210/321.64 |
| 7,862,720 B2 | 1/2011 | Brown | 210/335 |
| 2005/0056582 A1 | 3/2005 | Patel et al. | 210/266 |
| 2014/0048469 A1 * | 2/2014 | Wilder et al. | 210/232 |

* cited by examiner

SIMPLIFIED FILTER

This application is a continuation-in-part of and claims priority from U.S. Provisional Patent Application Ser. 61/638,997 filed Apr. 26, 2012 for a SIMPLIFIED FILTER CONSTRUCTION.

FIELD OF THE INVENTION

1. Field of the Invention

The present invention relates to a simplified filter structure having a rigid adsorptive filtering medium functioning as a structural wall of the filter, a flow regulating and diffusing element of the filter, and as a filter element. The adsorptive filtering medium defines a chamber to contain a mechanical filtering medium.

2. Background

In the filtration of fluids such as water and some gases, particulates are typically removed through mechanical filtration. A mechanical filter typically is structured with a plurality of holes or openings (pores) the size of which is selected to restrict the passage of contaminating materials while allowing fluids and materials that can fit through the pores to pass. Some filters are made, inter alia, using selected paper having a number of pores. The paper may be formed in particular ways (e.g., pleated) into paper structures. U.S. Pat. No. 7,473,362 B1 (Nohren, Jr) and U.S. Patent Application Publication US 2005/0056582 A1 (Patel, et al) both disclose filters of the type that include a porous paper element that is formed with pleats.

FIG. 1 shows a prior art filter 200 in which a fluid is passed through a membrane 202 that is laminated between two polypropylene (PP) supports 204 and 206 which are sometimes called "scrim." The membrane 202 and its supports 204 and 206 are held in place between a rigid inner polypropylene (PP) core support 208 and a rigid polypropylene outer cage 210 held in position by a polypropylene end cap 212 and a bottom fitting 214. The membrane 202 is a sheet of porous material like paper that has a plurality of pores that are quite small in diameter and are sized so they are measured in microns (e.g., from about 0.1 to about 10.0 microns). Various paper and plastic based materials have been found to be well suited for use as the membrane.

FIG. 2 shows a prior art filter cartridge 220 having an external cage 222 which appears to be made of plastic and which is made to surround and hold a pleated filter 224. The pleated filter 224 surrounds an inner core support 226 also that appears to be made of plastic and to extend the length of the pleated filter 224.

Filters of the type seen in FIGS. 1 and 2 can have concentration spots. That is, the supporting structures like the cages 208 and 222 restrict or block flow through a portion of the filter surface leading to concentration of flow through or in the open areas that are not blocked. Thus some portion of the surface of one of the filtering material is blocked or not engaged. This results in a concentration of contaminant build up in the areas that are exposed to concentrated flow and a potential for an increase in flow rate in a localized area that is not blocked which in some cases leads to increased localized flow rate that may exceed the filter's ability to remove particles.

More recently filters have been developed that are configured to remove dissolved organic contaminants appearing on a molecular level through adsorption or organically active materials. U.S. Pat. No. 7,473,362 B1 (Nohren, Jr.) shows use of a semi porous composite fibrous material formed into an accordion pleated form constructed to remove certain targeted materials in the fluid with the aid of a strong electropositive charge attraction.

Very small contaminants, including microorganisms down to sub-micron sizes, are known to have been filtered using some form of membrane technology. The membrane structure has pores sized to be smaller than the target contaminant. Due to the "sieving" function of membrane filters, contaminants tend to be caught on the surface of the filter and may build up, causing premature "fouling" of the filter resulting in reduced flows, increased pressure drop, and shortened filter life. Thus a filter with increased filter surface area can have a longer life.

Traditionally, adsorption materials or other reactive filtration materials have been provided as a granular mixture. For example, loose bed carbon filters have been used to remove organic contaminants from fluids such as water. It is also known to use carbon particles blended together with a small amount of a thermoplastic binder material to create carbon block. More recently, a variety of filtering materials have been integrated into a single filter in a plastic matrix. In U.S. Pat. No. 7,112,272 B2 (Hughes, et al), a filter device and method of manufacturing a filter device is described that allows the user to incorporate any filter material or a combination of filter materials in a porous plastic matrix. The fluid being filtered flows through the porous matrix where it is forced into contact with the adsorbents or other filtering materials.

In a filter having adsorption as a primary filtration mechanism, higher flow rates typically result in lower contact time between the fluid and the adsorptive retention materials. In turn, the fluid may not have sufficient contact time with the adsorptive retention materials to remove the desired contaminants. In other words, with high flow rates over all and/or in localized areas of the filter, the efficiency of the filter may be decreased.

To address the inability of mechanical filters to deal with contaminants that can only be removed by adsorptive filter media and the caking problem reducing the usefulness of adsorptive filtration devices when dealing with larger contaminants, it is known to combine a mechanical filter component and an adsorptive filter component. It is also known to use a filter which has a strong electropositive charged surface of treated microfibers in a highly porous media which is claimed to be capable, under certain conditions, in removing organisms as small as viruses from a low pressure water stream. See U.S. Pat. No. 7,473,362 B1 (Nohren, Jr.). Because of the reliance on electrostatic charge differential as the primary mechanism for removal of particles less than 2 µm (microns) in size, the velocity of the particles passing through the filter matrix may exceed the adsorptive capability of the filter media to attract and capture them, resulting in particles passing through the filter without being removed. This phenomena is sometimes referred to as "blow-by". "Blow by" is of greater risk when the system has no external or secondary method to control the flow rate though the filter.

An important measure in determining the performance of a filter is the filter's maximum effective flux rate. The flux rate is the ratio of flow divided by the available surface area of the filter. The flow rate of the filter is the amount of fluid that passes through the filter in a given time period. Higher flow rates allow more fluid to be filtered in less time. Flow rates may be affected by the porosity and pressure gradient of the filter and the adsorptive ability of the adsorption filter, or by outside factors, such as, for example, housing design, restrictive fittings and orifices. Flow rates are typically reduced by the cage structure or support structure used to support membrane filtration media leading to the need for higher system pressures and/or even larger filters.

An increase in the filter area at a constant flow rate reduces the flux, or amount of fluid that must pass through a particular portion of the filter at any given time. The lower the required flux, the greater the efficiency of the filter. It is accordingly preferable to increase the effective filter surface area as much as possible, while maintaining a constant flow rate. However, increasing the filter surface area is not always possible in applications where physical size, and weight constraints prevent use of larger devices. Indeed, simply making a larger filter with a larger filter surface area is not possible for those application like, for example, filters of the type that are "handheld" filtration devices associated with or used with personal water filtering devices for outdoor, emergency or military use.

In an adsorption filter, however, higher flow rates may not allow the fluid sufficient contact time with the adsorptive retention mechanisms, decreasing filter efficiency. Many filters including both a mechanical filter component and an adsorption filter component will thus have an optimal flow rate which is the rate at which the pressure required to pass the fluid through the mechanical filtration mechanisms of the filter is not too great, while allowing sufficient contact time with the adsorptive retention mechanisms of the filter.

As noted, the cage or housing of the filter (e.g., like cage 210 and cage 222) creates trouble zones or concentration areas on the surface of a given adsorptive filter because the housing design (e.g., the lattice structure) of the device creates increased flow in a localized area that may exceed the recommended flux rate for the adsorptive filter and also lead to excessive build up of material that is being filtered. This phenomenon is known to exist particularly in pleated filters at the tips of the pleats, or where filter cages, intended for support, concentrate flows through the perforated surface of the exterior and/or interior support cage. Such designs have been known to allow some particles such as virus particles to pass through the electrostatically charged filter media due to the increased flux in a small localized area of the filter surface. Thus the filter is less efficient and may even present a possible risk to the user.

Some filters having both adsorptive and mechanical filter functions use a pleated porous media that is cylindrical in shape like those seen in Nohren, Jr. To form the cylindrical pleated media which is sometimes called a "pleat pack," two opposite ends must be joined creating a seal that runs the length of the filter which seal can be said to be axial. Also, the top and bottom of the cylindrical filter media must be effectively sealed to a housing or container (e.g., end caps) of some kind to prevent leakage around the media using potting materials. The seams joining the ends may fail; and the seal to the housing or container effected by the potting materials may also fail. Potting material may be softened during assembly and while soft, the end of the cylindrical pleat pack is forced into the potting material to effect a melt seal. Melt seals can sometimes create an hydrophobic edge where the filter media does not wet out. Melt seals are also slow and require extreme pressure on the pleat pack to effectively embed the pleated ends into the end cap. This can lead to errors in assembly that decrease quality because some filters are simply defective.

Recognized methods for creating the axial seal include sonic welding and direct heat, both of which have deficiencies when applied to the pleated paper of the type described in U.S. Pat. No. 7,473,362 B1 (Nohren, Jr.). That is, the sealing is not as effective as desired leading to leaks. Sonic welding is known in some cases to pulverize the filter media in the area of the sonic weld particularly when the weld intensity settings are improper. In some cases, it has been shown one must revalidate settings and validate the welds with every batch of media. This process is costly, time consuming, and generates a large amount of scrap. Constant heat welding is less disruptive to the media, but is slow and requires specialized equipment and fixtures to assure a consistent weld. Thus existing methods lead to increased cost. Further, constant heat welded seam are more likely to delaminate than sonic welded seams, causing a potential leak path or short circuit potential for very small particles.

When one of the pleated filter elements is made of a porous filter material formed of glass microfibers, the use of direct heat is not sufficient to cause a "weld." Thus the filter media can have contaminating fluid bypass through areas of the weld that are defective. To address this problem the glass microfiber portion of the filter must be "sandwiched" or laminated between two layers of heat sealable material (sometimes called "scrim") as seen in FIG. 1 (Prior Art). In some configurations, additional fibers of polymer are added to the glass fiber porous filter media to further enhance the heat sealing capability. However, the addition of polymer fibers to the glass fiber filter media during formation creates a potential for inconsistencies in pores and the flow rate over the surface area of the filter material. That is the composition of the material varies over the surface area leading to an increase in the number of areas of higher and lower concentrations of either filter material or polymer fibers. As a result of inconsistencies in the media, selected filters may fail to remove sufficient amounts of material to be filtered like virus material. Further, the addition of polymer fibers results in thicker and less pliable media so that it is more difficult to form the desired pleats as tightly as desired reducing the amount of surface area available.

Filters employing both a mechanical filtering mechanism and an adsorption filtering mechanism are known. For example, U.S. Pat. No. 5,045,195 (Spangrud, et al.) shows a water filter having an activated charcoal filter between two mechanical filter layers. In U.S. Patent Application Publication 2005/0056582 A1 (Patel, et al) two mechanical filters are arranged as concentric cylinders, with the space between the mechanical filters filled with a granular adsorption filter material.

In all the above filters, various structures are used to support and contain the filtering media. The structures include internal and external supports like the cages and cores seen in the prior art of FIGS. 1 and 2. The cages and supports create flow concentration zones and blind spots which reduce the amount of surface available to filter and impact on a fluid system because the structure of the filter leads to the need for higher pressures and/or bigger filters. A simplified filter construction and in turn lower cost construction is needed that employs effective two stage, adsorptive and mechanical filtration, flow control so that the maximum flux rate is not exceeded, flow diffusion to eliminate flow concentration zones and that provides structural strength and shape thus eliminating the need for a perforated cage component, and allowing increased usable surface area in the downstream mechanical filter.

BRIEF SUMMARY

The filter disclosed provides, among other things, a system and method for filtering contaminants from a fluid. A filter includes a structurally strong or rigid adsorptive filtering medium (AFM) forming a hollow chamber and a mechanical filtering medium (MFM) situated inside the chamber. The fluid enters the filter through substantially the entire face of the adsorptive filtering structure. The hollow chamber may be capped at each end such that the caps effectively seal the fluid source from the interior of the chamber, and the exterior of the mechanical filtering medium from the interior of the mechanical filtering medium. The adsorptive filtering medium and the mechanical filtering medium may be customized to effectively remove/reduce contaminants present in a particular fluid. Also, placing the adsorptive filtering medium on the exterior and directing flow from exterior the adsorptive filtering medium to interior the adsorptive filtering medium allows for greater usable surface area, increased adsorptive media volume, and greater contact time for enhanced filtering.

In some embodiments, the rigid or solid adsorptive filter medium (AFM) structure is combined in combination with at least one cap which seals the interior of the AFM from the exterior of the AFM, and the interior of the MFM from the exterior of the mechanical filter medium (MFM). The cap seals the exterior of the AFM from the interior of the AFM by being adhered by hot melt, welding, overmolding, or plastisol bonded to the AFM. The cap may seal the exterior of the MFM from the interior of the MFM by being adhered to the MFM.

In one embodiment, the mechanical filtering medium is pleated to increase the surface area of the mechanical filtering medium. Other geometric configurations may be used in lieu of the pleats. In addition, the pleating may allow the MFM to maintain its position and form within the AFM by exerting a radial pressure holding the MFM in place.

The AFM and the MFM can be selected to filter the contaminants known or suspected to be in a particular fluid source. The porosity of the AFM, the adsorptive filtering material content of the AFM, the polymer binding material of the AFM, and the porosity and material of the MFM may be varied to more effectively treat a given set of contaminants.

In use, the fluid source may be analyzed and the contaminant or combination of contaminants in the fluid source identified. The AFM and MFM may then be selected to target and in turn more effectively remove the identified contaminants. The AFM structure containing the MFM may then be placed in the fluid source to allow the fluid to flow through the AFM and the MFM. If a filter cake is formed of accumulated particulate matter, the relatively smooth AFM may be simply scraped to remove the accumulated particles.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

A more complete understanding of this disclosure may be derived by referring to the detailed description when considered in connection with the following illustrative figures. In the figures, like reference numbers refer to like elements throughout the figures.

DETAILED DESCRIPTION

In the following description, and for the purposes of explanation, numerous specific details are set forth in order to provide a thorough understanding of the various aspects of the illustrated embodiment. In other instances, known structures and devices are shown or discussed more generally in order to render the description more understandable. The description of the operation may also be sufficient to enable one to implement various forms of the invention. It should be noted that there are many different and alternative configurations of the disclosed filter as well as many different fluids with which the disclosed filter may be used. The full scope of the inventions is not limited to the examples or embodiments that are described below.

Figure 3:
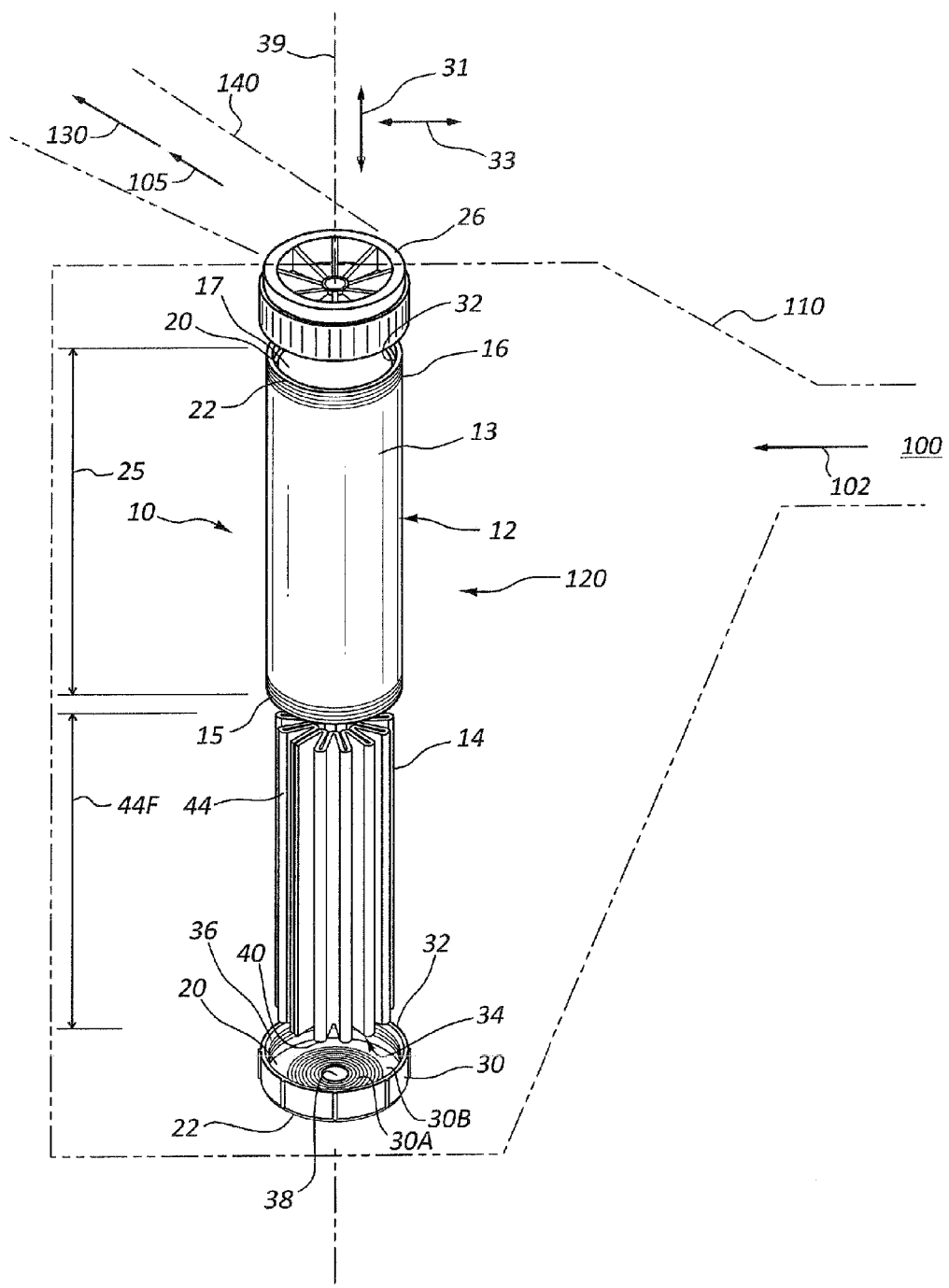
FIG. 3 is an exploded side perspective of one embodiment of the disclosed filter.

In FIG. 3, a source 100 of fluid 102 is connected to the filter 10 by a suitable containment structure 110. The containment structure 110 is shown in dotted line because it is any fluid containment device from a hard structure to a soft or flexible structure that is intended to hold or contain a fluid such as water. That is, the containment structure 110 may be a canteen, a bottle of any size or shape, a can, a receptacle, a plastic bag, a water can, a pipe sized to filter a fluid flowing in the pipe, and virtually any and all other structures in which fluid 102 is directed to flow 120 into and through the filter 10 and out 130 through exit structure 140. Thus, the containment structure may be a separate housing having an inlet and outlet for connection "in-line" in a continuous flow fluid system. While the fluid for this embodiment is a liquid and more particularly water for human consumption, the fluid may be a gas such as air or other gases in suitable concentrations for inhalation by a living subject (e.g., human, animal, etc) such as nitrous oxide and oxygen.

The exit structure 140 may be any structure from a mouthpiece or bite valve or push-pull valve (for use in drinking), a spout, a pipe or conduit or any other structure to direct the filtered fluid 105 to a desired location or use. While the source of fluid 100 may supply a continuous flow of fluid 102, it may also be a static source such as a container filled with fluid 102 with the filter 10 immersed in the fluid 102. Those skilled in the art will recognize that the filter 10 and the containment structure 110 as well as the exit structure 140 may be configured and sized based on the amount of fluid 102 involved and the nature of the container and/or use. In preferred applications, the containment structure 110 is a bottle or bottle-like device sized to hold from about a quart to about a half gallon of liquid like water.

As seen in FIG. 3, the filter 10 includes an adsorption filtering medium (AFM) 12 and a mechanical filtering medium (MFM) 14. The AFM 12 also effects a mechanical filtration of the fluid 102 based on the structure (e.g., pore size or porosity) of the AFM 12. The AFM 12 is formed of a filtering material or combination of filtering materials formulated to filter out a particular targeted contaminant or combination of contaminants (e.g., first contaminants). The filtering materials used to form the AFM 12 are sintered and may include adsorbents, such as, but not limited to, granular and powdered activated carbon, metal ion exchange materials, zeolite, sorbents such as Engelhard's ATS, activated aluminas such as Selecto Scientific's Alusil, ion exchange resins, silver, zinc and halogen based antimicrobial compounds, acid gas adsorbents, arsenic reduction materials, iodinated resins, textile fibers, as well as other polyethylene polymers.

In a particular embodiment seen in FIG. 3, the combination of materials in the AFM 12 and the composition of the MFM 14 are configured to treat a particular fluid source known or suspected to have a particular mix of contaminants. Thus, the filter 10 may be configured to filter or reduce the concentration of, for example, heavy metals like lead, arsenic and mercury and to remove, at the same time, biological materials like cladosporium and giardia.

In FIG. 3, it can be seen that the AFM 12 is formed into a solid cylinder. That is, the AFM 12 is formed into a rigid or effectively rigid shape or form through, for example, pressing, injection molding, sintering and any other process that combines the adsorption materials in a polymer matrix that is structurally solid and yet porous. The AFM 12 is in turn formed to have sufficient structural strength to function as the exterior wall of the filter 10 without the need for an additional support structure so that it is in effect, an exoskeleton. The AFM 12 seen in FIG. 3 is formed of a sintered material because it has structural rigidity and/or strength so that it is self supporting and able to function as the rigid sidewall that is effectively non-compressible and with sufficient shear strength so that it is able to support the MFM 14. In effect the AFM 12 functions as the structure that provides the entire filter 10 with axial strength. At the same time, the MFM 14 is retained within the AFM 12 without itself providing any significant or substantial mechanical support and preferably no mechanical support to resist compressive and tensile forces 31 applied axially or normal 33 to the axis 39 of the filter 10. At the same time, the AFM 12 mechanically connects to end caps 26 and 30 to form a structurally rigid filter and to function as an exoskeleton without the need for internal or core supports or external cages. Thus, a selected filter media like AFM 12 functions as both a filter and as a structural member thereby eliminating the need for additional structure to create a mechanically rigid assembly, while at the same time making more filtration surface area available by allowing the AFM to expand to the full diameter of the end caps. That is, for a given desired diameter 21A (FIG. 5) of filter 10, the absence of an external cage or similar structure means that the diameter 19 of the AFM 12 may be larger thereby increasing the surface area available for filtration.

Figure 2:
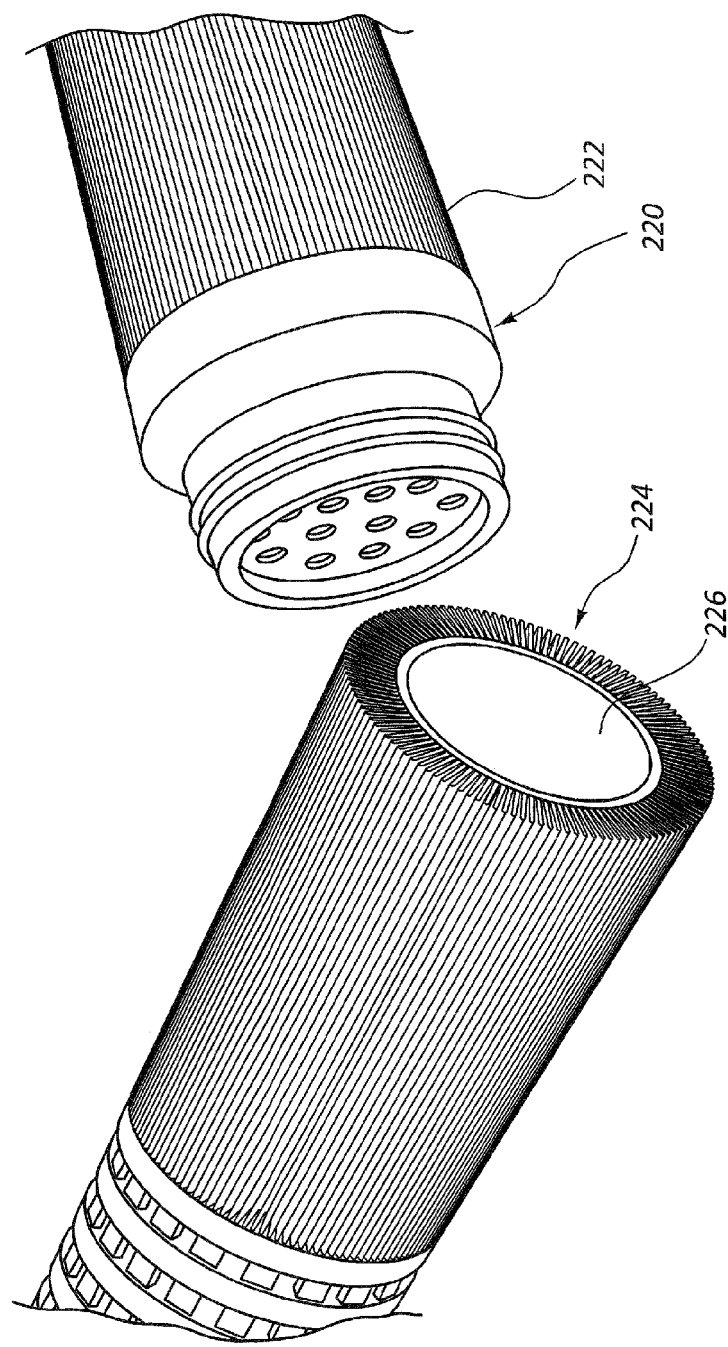
FIG. 2 is a perspective depiction of an alternate prior art filter with different views and a cut away portion.
Figure 3A:
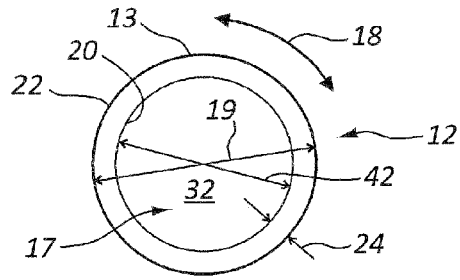
FIG. 3A is a cross section of an adsorptive filter medium of the filter of FIG. 3.

It should also be understood that the AFM 12 may be formed into any desired shape. Thus the AFM 12 of FIG. 3 functions as a wall 13 that is cylindrical eliminating the need for a cage similar to those shown in FIGS. 1 and 2 (Prior Art). The AFM 12 is shown in FIG. 3A removed from the other elements. While shown to be cylindrical in cross section in FIG. 3A, the AFM 12 may be formed in any desired mechanical shape. For example, it is within contemplation that the AFM 12 may be, in cross section, octagonal, rectangular, elliptical, square, and triangular. The AFM 12 may also vary in dimension from one end 15 to its other end 16 so that it is shaped to be trapezoidal, conical, a parallelepiped, or the like.

As stated, the AFM 12 functions not only as a filter formed from sintered material so it is porous but also as a wall structure 13. The porosity is the ratio of void space to that of the solid material and goes from 0 to 1 with desired porosity for the AFM 12 ranging from 0.2 to 0.8. The pore size may be relatively small and extend from 0.1 to 10 microns. In turn, the fluid passing through the filter 10 oozes through the AFM 12 at a rate related to the pressure of the fluid. Thus with a pore size between 0.3 microns and 10 microns, and with pressure from about 1 pound per square inch to about 10 pounds per square inch for a typical hand held filter, the fluid may flow through the filter at a rate between about 10 cubic centimeters per minute to about 200 cubic centimeters per minute. A typical AFM 12 is preferably a porous plastic formed granulated activated charcoal (GAC) and zeolite. It may also be made of sintered metal but may also be a sintered ceramic.

Configured as illustrated in FIGS. 3-6, the filter 10 eliminates the need for a separate housing, casing, or other enclosure to provide strength to, and function as the rigid portion of, the filter 10. While it may be placed inside of a housing or other structure, such structures are typically formed to direct fluid to flow through the AFM like AFM 12 and then to or through whatever is then the other selected filter medium like MFM 14. Thus, the AFM 12 eliminates the need for cage-like cages 210 and 222 to support and/or retain filter media. A filter 10 configured to be placed in line may be exposed to fluid line pressures that may range from a few pounds per square inch to over 100 pounds per square inch and may experience flow rates from about 1000 cubic centimeters per minute to about 10,000 cubic centimeters per minute.

The wall 13 of FIGS. 3 and 3A has an interior face 20, an exterior face 22 and a thickness 24. The wall 13 may be uniform throughout its height 25. The wall 13 may also vary in thickness from one end 15 to the other end 16 and in between to create an esthetic appearance that is desired and/or to effect changes in flow rate of the fluid 102 to proceed at different flux rates in different zones along the height 25 (e.g., six inches) and in turn impact on the rheology of the fluid flow and the effectiveness of the filter 10 based on the time the fluid is in and passing through the AFM 12 to experience ion exchange or to be exposed to other active filtering materials. Similarly, the thickness 24 may be uniform or variable about the circumference 18 of the wall and along the axis 39.

The thickness 24 of the wall 13 of the AFM 12 is selected to control not only the time the fluid 102 is in contact with the AFM 12 but also to control the fluid flow rate of the fluid 102 through the filter 10. That is, the larger the thickness 24, the longer the fluid 102 is in contact with AFM 12 that forms the wall 13. It is presently believed that the larger the thickness 24, the higher the resistance to the flow of the fluid 102. Thus, generally the larger the thickness of the wall 13, and the smaller the flow rate of the fluid 102 through the AFM 12 filter and the filter 10.

Both the thickness 24 of the wall 13 and the porosity of the AFM 12 impacts and are selected to regulate the flow rate through the filter 10. Generally less porous means that the fluid will flow at a slower rate, and more porous means that the fluid 102 flows at a faster rate. That is, the porosity of wall 13 is also selected to control the time the fluid 100 is in contact with the AFM 12 filter.

Also the size of the AFM 12 impacts on the flow rate of the fluid 102 through the AFM 12 as well as the filter 10. That is, the height 25 as well as the diameter 19 for the cylinder shape in FIGS. 3-6 is selected to provide a desired surface area and adsorptive media volume. Other shapes and sizes may be used to change the surface area and adsorptive media volume and, in turn, change or control the flow rate of the fluid 102 through the equivalent of the AFM 12. Indeed, the wall 13 may be formed into various shapes including shapes to enlarge the surface area of the wall 13 presented to the fluid 102 as it passes through the equivalent of the AFM 12.

Figure 6:
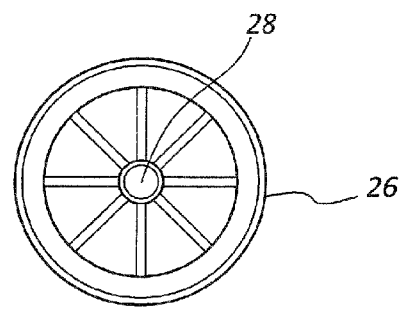
FIG. 6 is a top view of the end cap of the filter of FIG. 3.
Figure 5:
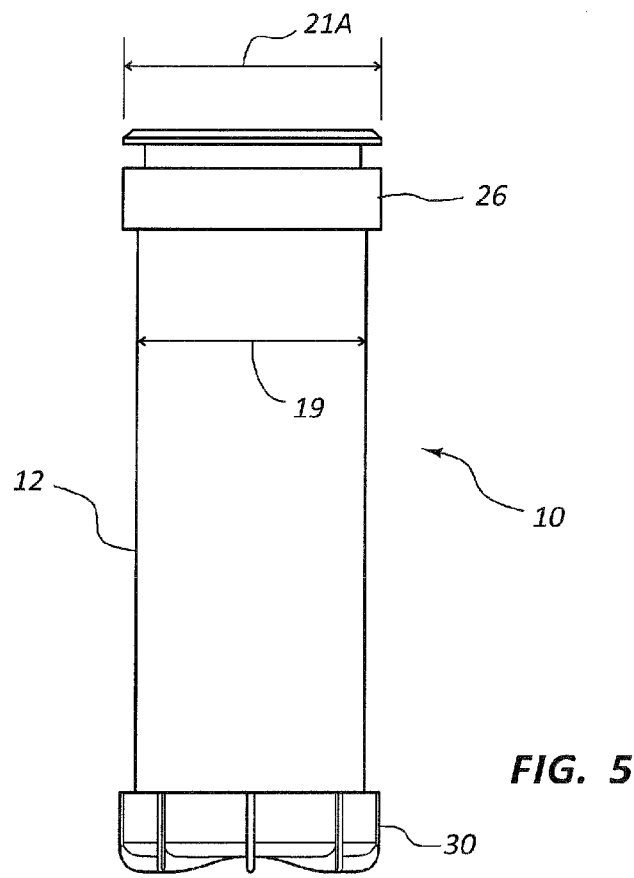
FIG. 5 is a side view of the assembled filter of FIG. 3.
Figure 4:
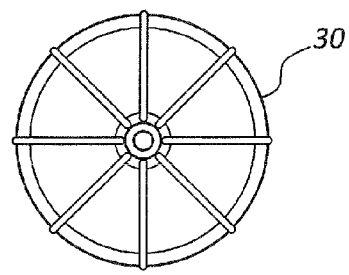
FIG. 4 is a bottom view of the seal cap of the disclosed filter of FIG. 3.

Referring to FIGS. 3, 5 and 6, the first end 16 of the AFM 12 is capped with an end cap 26. The end cap 26 has at least one opening 28 to allow filtered fluid 105 to pass through the end cap 26 from the MFM 14 positioned inside of the AFM 12. It is preferred that the end cap 26 perform multiple functions and not only seal the upper end 16 of the AFM 12, but also function to effect a seal for the MFM 14 while directing the filtered fluid 105 to the opening 28 for further direction by the exit structure 140.

While any number of structures may be connected to the second end 15 of the AFM 12 to seal the interior and direct fluid 102 passing through the AFM 12 into the interior 17 of the AFM 12 and the filter 10, the embodiment shown in FIGS. 3-7 seals the second end 15 of the AFM 12 with a seal cap 30. Seal cap 30 is structured to direct the fluid 102 from the region 36 and into the MFM 14 and also to direct fluid 105 exiting the MFM 14 from the interior 34 to the at least the one opening 28 in the end cap 26.

End cap 26 and seal cap 30 may be composed of a suitable solid material including suitable metals and plastics. Various plastics or polymeric materials are preferred as they are less costly and of sufficient strength. The end cap 26 and seal cap 30 may be coupled to the AFM 12 by any method to effect a fluid tight or fluid resistant seal between the end cap 26 and the AFM 12. For example, the end cap 26 and seal cap 30 may be made by injection molding a suitable polypropylene; and the seal cap 30 and end cap 26 are secured to the AFM 12 and the MFM 14 by any suitable method which includes, but is not limited to, gluing, welding, overmolding and bonding using a plastisol. Mechanical seals using force fit structures, swaging structures and even threaded arrangements using 'o' rings may be used in selected applications to secure the end cap 26 and seal cap 30 to and with the AFM 12.

As seen in FIG. 3, the interior face 20 of the AFM 12 defines the interior 17 of the AFM 12 which is a chamber 32 in which the mechanical filter medium (MFM) 14 is positioned. The interior surface 20 of the AFM 12 has a usable interior surface area which is the interior surface 20 less that surface area which is blocked or reduced by the hot melt 30A or other adhesive used to secure the seal cap 30 and end cap 26 to the AFM 12. The wall 13 area between the interior surface 20 and the exterior surface 22 of the AFM is formed as stated before so that the fluid flow from the interior surface 20 is effectively uniform across the surface area of the surface 20 so that the fluid flow is relatively even across the surface of the MFM 14.

The MFM 14 may be composed of any suitable material for use as a mechanical filter. For example, the MFM 14 may be composed of filter paper or a membrane filter. The MFM 14 may be accordion-pleated or otherwise shaped to increase the surface area of the MFM 14 that is presented to the fluid 102. In the embodiment of FIG. 3, the MFM 14 is pleated and sized so that at rest it has a diameter 35 that is virtually the same as or a hit larger than the interior diameter 42 (or cross section) of the chamber 32 (FIG. 3A). It may be said to be slightly over sized so that one must wind it or collapse it to a smaller diameter or cross section and hold it in that position manually or with a suitable clip or other device before positioning the MFM 14 in the chamber 32. After positioning in the chamber 32, the user releases the MFM 14 or removes a clip or other device so that it unwinds much like a spring and in turn exerts a radial pressure 43 on the interior face 20 of the AFM 12. Thus, the MFM 14 does not need the support of a cage-like cage 210 and cage 222 (FIGS. 1 and 2) and it does not need an internal core, like core 208 and core 226. In turn, the filter 10 is formed from the AFM 12 that functions as a filter, as a wall and as a support to retain the MFM 14 without other support or retention structure other than ends like end cap 26 and seal cap 30.

Figure 7:
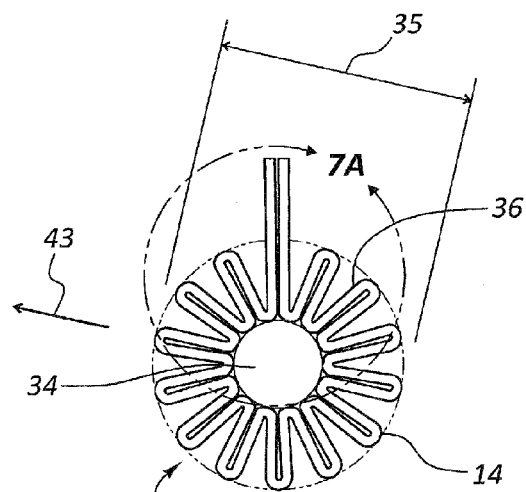
FIG. 7 shows the mechanical filtering medium of FIG. 3 in cross section.
Figure 7A:
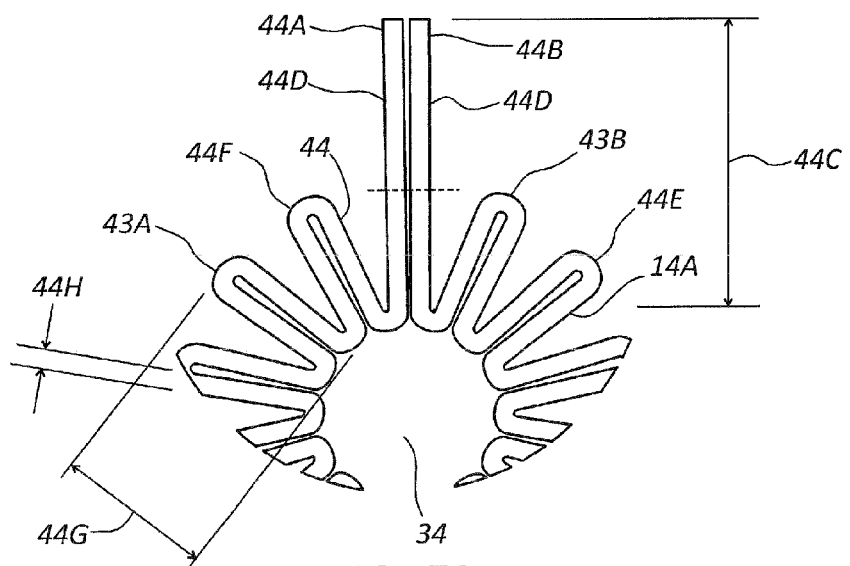
FIG. 7A is a partial enlargement of the mechanical filtering medium of FIG. 7.

FIG. 7A is an enlargement of the MFM 14 of FIG. 7 and together with FIG. 7 show that the MFM is formed of a porous paper material 14A that is selected and formed to remove desired particles. A paper material like that disclosed in U.S. Pat. No. 7,473,362 B1 (Nohren, Jr.) and available from several commercial sources such as Ahlstrom of Helsinki, Finland has been found to be suitable. The paper material is porous and has a porosity that differs from the porosity of the AFM 12 and is typically of a higher porosity than the AFM 12. Thus the MFM 14 filters or inhibits the passage of second contaminants from the fluid 102. The MFM 14 is shown being formed from a rectangular sheet into a plurality of pleats 43A and 43B. In FIG. 7, thirteen pleats are formed into the sheet 44 with a fourteenth pleat formed by sonically welding the opposite ends 44A and 44B of the sheet 44 substantially along the length 44C. After the ends 44A and 44B are joined, the excess portion 44D is trimmed or cut off by any suitable means including a cutter or a scissors. It may be noted that the ends of the pleats like ends 44E and 44F are rounded rather than folded to form points to reduce spots of decreased flow and increase the available surface area of the MFM 14. The rounded points, like ends 44E and 44F are also preferred as they are easier to form. It should be understood that the number of pleats, e.g., pleats 43A and 43B having thickness 44H, may vary based on the size and shape of the filter like filter 10.

Figure 7B:
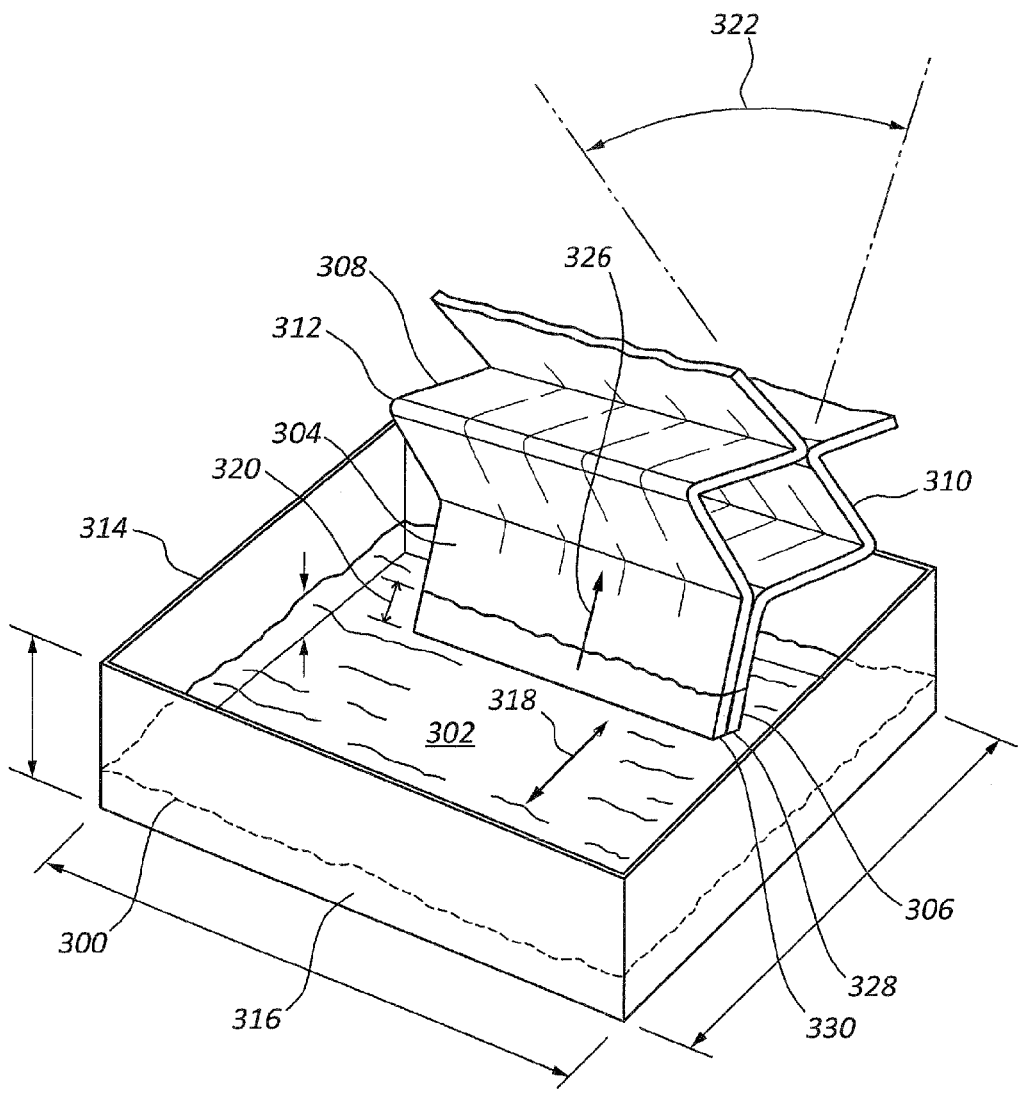
FIG. 7B is a partial perspective of a mechanical filtering medium positioned relative to a heated source of adhesive.

In reference to FIG. 7B, a heated pan 300 is shown containing heated hot melt adhesive 302 in liquid form with the ends 304 and 306 of mechanical filter medium 308 positioned in the hot melt adhesive 302. The pan 300 may be any suitable tray, container, or the like that can be heated to a sufficient temperature to melt and to keep the hot melt adhesive 302 in liquid form. A small electric skillet has been found suitable while other heated pans or containers of different types may also be used. The hot melt adhesive 302 here used is preferably a thermoplastic that is solid at room temperature and liquid when heated to a temperature above ambient so that it melts. Typically, a suitable hot melt adhesive used here will melt between about 230 degrees Fahrenheit to about 350 degrees Fahrenheit. The temperature of the pan 300 may be controlled to vary the viscosity of the hot melt adhesive. Preferably the hot melt adhesive 302 is heated to maintain it at low viscosity which varies with the hot melt adhesive selected; but the viscosity is preferably close to that of heated syrup.

The ends 304 and 306 are comparable to ends 44A and 44B seen in FIG. 7A. To join the ends 304 and 306 together, the user grasps the mechanical filter medium 308 in a way that the ends 304 and 306 are positioned against each other with the other pleats, e.g., pleats 310 and 312, held back and out of the way by the user's hand and fingers so that ends 304 and 306 extend outwardly generally as shown. The ends 304 and 306 are positioned in the hot melt adhesive 302 and preferably abut or touch the bottom 316 of the pan 300. The user may then gently push the ends 304 and 306 back and forth 318 to coat the ends 304 and 306 with the hot melt adhesive 302 and to allow the hot melt adhesive to wet the ends 304 and 306. The depth 320 of the adhesive and the manner of back and forth movement along with the angle 322 (e.g., from about 10 to 45 degrees) the ends 304 and 306 are positioned relative to a line normal to the bottom 316 of the pan are selected to ensure that the ends 304 and 306 are coated with hot melt adhesive 302 a desired distance 320 (FIG. 7B). That is, the hot melt adhesive 302 is coated onto and into the ends 304 and 306 following which the hot melt adhesive migrates upward 326 by capillary action to attain the desired distance 320. Upon removal of the ends 304 and 306 from the hot melt 302 and the pan 300, the edges 328 and 330 are held together and gently wiped along the edge 314 to remove excess and dripping hot melt adhesive 302. After removal from the hot melt 302, the adhesive coated on the ends 304 and 306 begins to cool and cure.

Figure 7C:
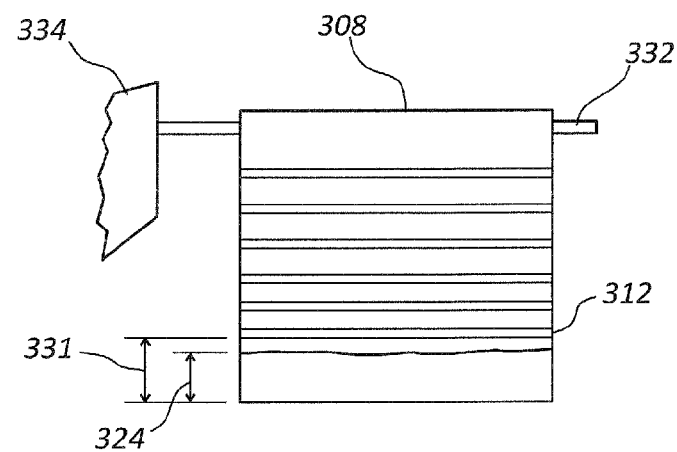
FIG. 7C is a side view of a mechanical filtering medium of the type in FIG. 7B positioned on a curing rack.

To facilitate curing the mechanical filter medium 308, it is placed on a rack or bar 332 (FIG. 7C) which extends away from a base or housing 334. The ends 304 and 306 are together and cooling and curing in the air. After cooling and curing, the mechanical filter medium 308 is next taken to a cutting or trimming location where the excess material is trimmed off leading the ends 304 and 306 at a height or length which is comparable to the length 44H seen in FIG. 7. Thereafter the mechanical filter medium 308 may be loaded into the AFM similar to that seen in FIG. 3.

Figure 7D:
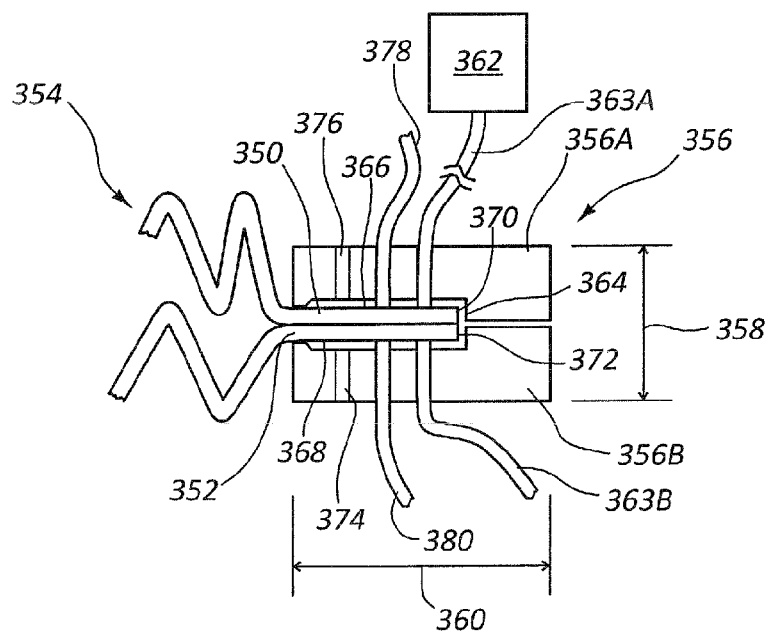
FIG. 7D is a side sectional view of a mold with a portion of a mechanical filtering medium positioned therein.

Alternately, the ends 350 and 352 of a mechanical filter medium 354 are trimmed to a suitable length 44H as seen in FIG. 7A and positioned in a mold 356 having a height 358 and length 360 (FIG. 7D). It has a width not shown that is sufficient so that the mechanical filter medium 354 fits in the mold 356. The mold 356 has halves 356A and 356B which come apart and come together and form a seal in any way presently practiced in the molding industry. A low density polyurethane 362 (LDPE) is heated to liquid form in a conventional manner and injected into the mold 356 under pressure. The pressure is developed or applied by a pump or piston or another device not shown and known to those skilled in the art. The polyurethane 362 proceeds through suitable channels or tubing, e.g., tubing 363A and 363B, or the like, for insertion into the mold cavity 364 to fill the cavity 364 with polyurethane 362 and to coat the side 366 of end 350 and side 368 of end 352 as well as the tips 370 and 372 of the ends 350 and 352 respectively. As the polyurethane 362 enters the mold cavity 364, the air therein is vented out vents 374 and 376. The mold 356 may have cooling water or simply be allowed to air cool so the polyurethane 362 hardens. Upon hardening, the ends 350 and 352 are separated from the mold 356; and the mold 356 is thereafter opened by air pressure or while air pressure is being supplied through multiple tubes like tubes 378 and 380. The ends 350 and 352 are therefore joined together and the mechanical filter medium 354 is ready for insertion into the AFM as seen in FIG. 3.

As best seen in FIG. 7, the MFM 14 is hollow and forms a center channel 34 that extends the length 44F of the MFM 14 (which is virtually the same as the length 25 of the AFM 12). The center channel 34 communicates with the opening 28 in the end cap 26 so that fluid coming into the center channel may pass out the opening. The center channel 34 is sealed to and by the seal cap 30 and held generally in position by or with a centering piece 38 positioned to register with the center channel 34. That is, the centering piece 38 holds the MFM 14 in general central alignment in the chamber 32. The MFM 14 also has a fluid space 36 between the MFM 14 and the interior face 20 of the AFM 12. While the end cap 26 is shown with one opening 28 in the end cap 26, it should be understood that other configurations may include multiple openings in communication with the center channel 34 which can be sized to control the flow rate through the filter 10.

It should be noted that the MFM 14 is sealed to the end cap 26 and the seal cap 30 to ensure that the fluid 102 passing through the AFM 12 into the area 36 is forced into and through the MFM 14. Thus all fluid 102 coming through the AFM 12 is forced through the MFM 14 and into the interior 34 and out the aperture 28 to the outlet structure 140. The MFM 14 may be sealed to the end cap 26 and the seal cap 30 in any one of several ways. Various glues, potting materials, plastisols and hot melts may be used. It is presently preferred to apply a hot melt adhesive 30 to the interior surface 30B of the seal cap 30 a similar surface of the end cap 26. The hot melt 30 is spread over an area of sufficient size on the interior surface so that the entire cross section of the MFM as seen in FIG. 7 may be urged into the hot melt 30. Thus the entire length 44G of each pleat, e.g., pleats 43A and 43B, is urged into the hot melt on the surface 30 with extra to spare so that the material is immersed and surrounded by hot melt to effect a seal when the hot melt 30 cures or cools. The end cap 26 also has a surface just like the surface 30. Hot melt like hot melt 30 is applied in a quantity to the interior surface of the end cap 26 so the MFM 14 and its pleats are all immersed into the hot melt a suitable distance (e.g., 2 mm to about 5 mm) to effect a seal. Sufficient hot melt may also be added to the interior surface of the seal cap 30 to effect a seal for the AFM 12 as well. As the end cap 26 and seal cap 30 are urged onto the ends of the AFM 12 while urging the ends of the MFM 14 into the hot melt like hot melt 30. Also, the end cap 26 and seal cap 30 may be made of a suitable plastic that allows the pleats of the MFM 14 to push into the material of the end cap 26 and seal cap 30 as the end cap 26 and seal cap 30 are heated sufficiently to cause them to soften. In the alternative, the MFM 14 and the AFM 12 may also be sealed into place with and against the end cap 26 and the seal cap 30 with a plastisol material applied similar to the hot melt 30.

In use, the filter material of the AFM 12 and the specifications of the MFM 14 are configured to efficiently remove contaminants known or suspected to be present in a fluid source 100. The AFM 12 is then created including filter materials for adsorptive filtering of the fluid from the fluid source 100. The desired MFM 14 is inserted into the chamber 32 of the AFM 12, and optionally sealed to or bonded with the end cap 26 and seal cap 30. The end cap 26 and seal cap 30 may also be bonded to the AFM 12 by, for example, using welding, overmolding or other suitable procedures. Of course one may provide interactive threads so that one may screw the end cap 26 and seal cap 30 to the AFM 12.

The assembled filter system 10 is associated with a fluid source 100 as hereinbefore discussed. A pressure gradient (i.e. positive pressure of the fluid or a negative pressure in the center channel 34) across the filter 10 from the outer surface 20 and the filtered fluid 105 induces the fluid 102 to flow from the source 100 toward the center channel 34 through the entire exterior surface area of the AFM 12. Relatively large particles are deposited on the exterior face 22 of the porous AFM 12, while smaller particles and dissolved contaminants pass into the AFM 12.

Inside the AFM 12, the contaminants interact with the adsorptive materials of the AFM 12 and are de-activated or removed from the fluid. Small particles that do not interact with the adsorptive materials pass through the AFM 12 to the fluid space 36 between the interior face 20 of the AFM 12 and the exterior face 44 of the MFM 14. Ideally the pressure gradient is maintained between the fluid space 36 and the center channel 34 to induce the fluid 102 to flow through the MFM 14 to the center channel 34. The MFM 14 may be selected to have pores which are sized to be, for example, less than 100 microns. Effluent in the center channel 34 may then be removed through the at least one opening 28 in the end cap 26 for its desired purpose.

Figure 8:
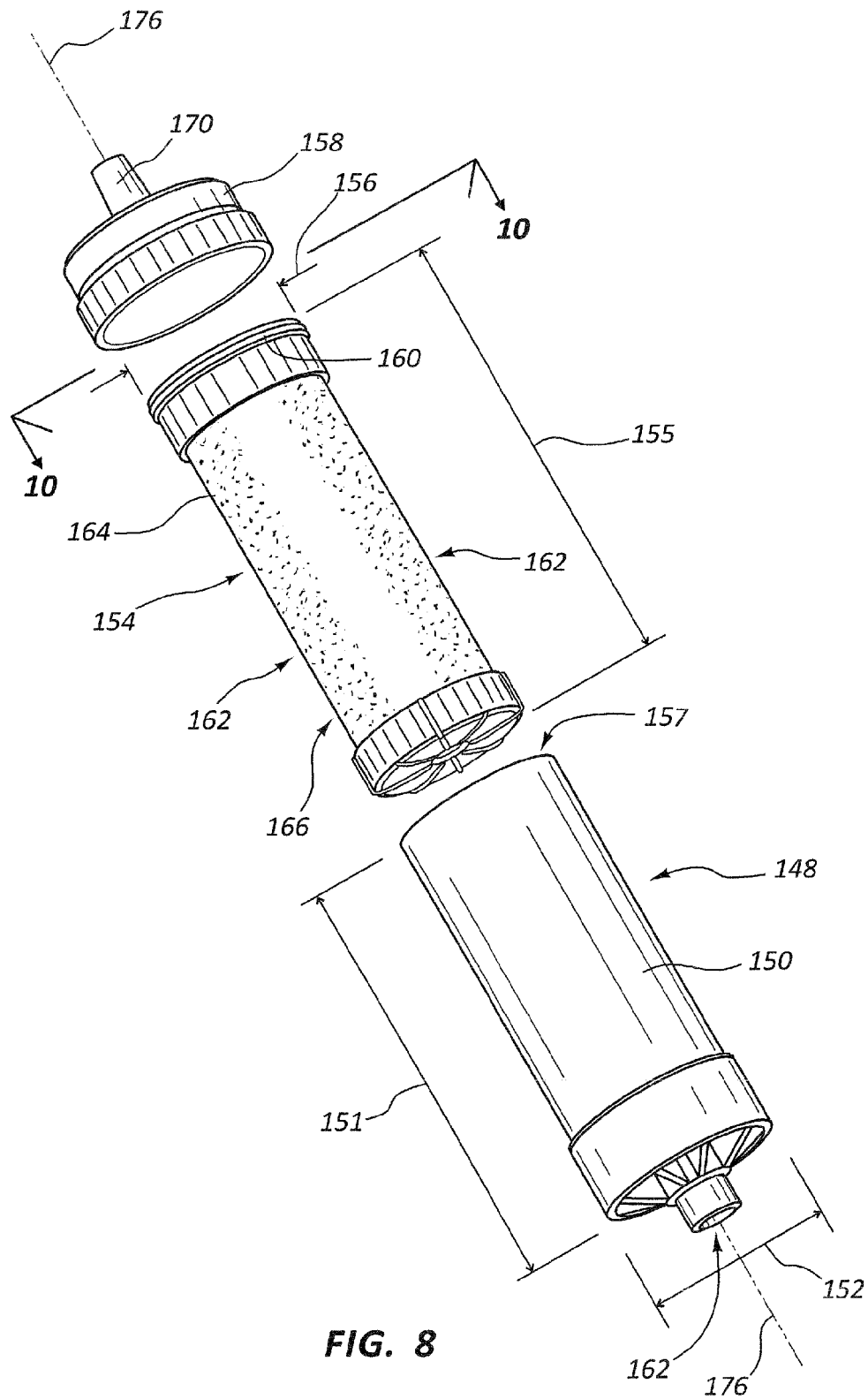
FIG. 8 is an exploded perspective view of another embodiment of the disclosed filter.
Figure 9:
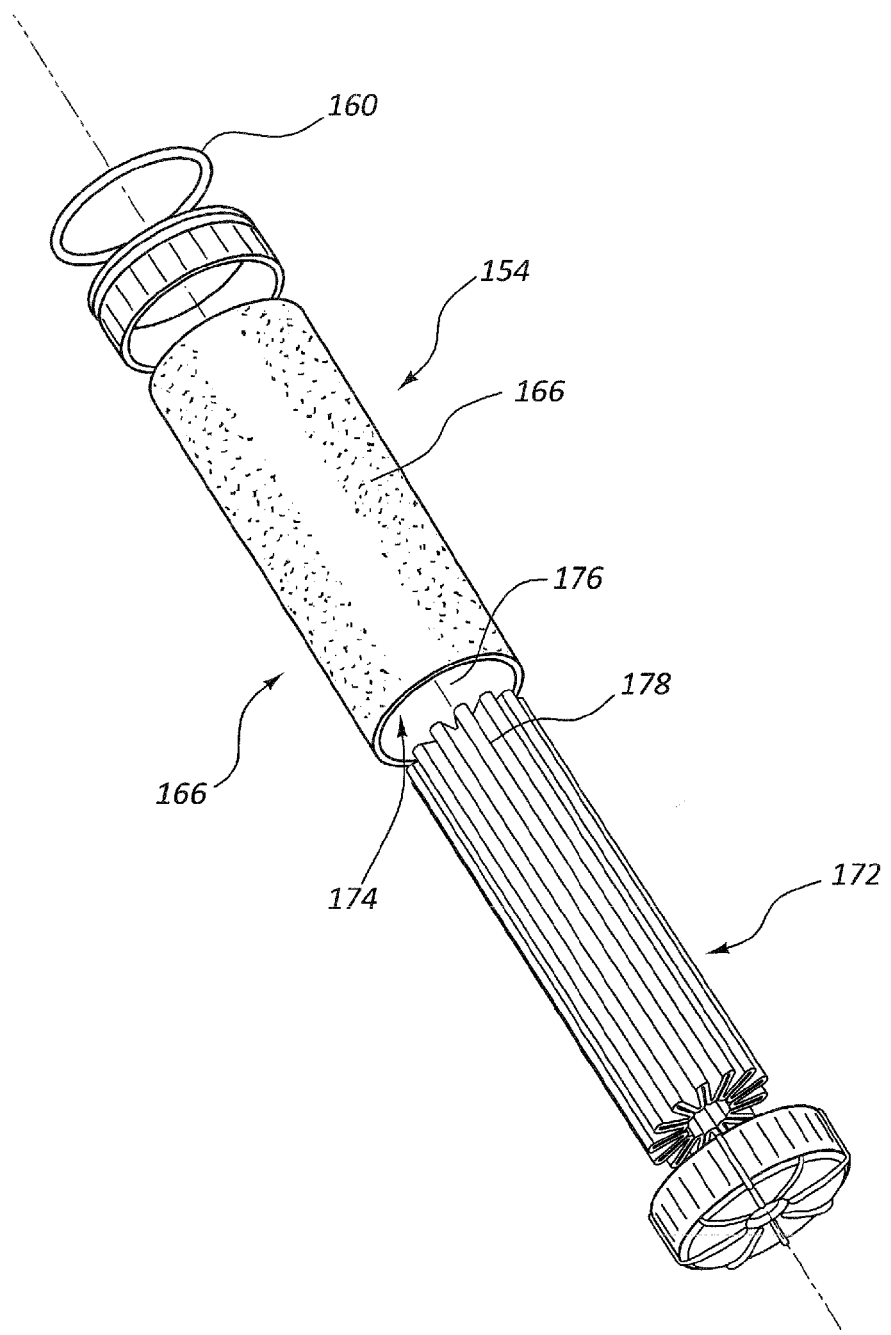
FIG. 9 is an exploded perspective view of a filter cartridge for use in the embodiment of FIG. 8.
Figure 10:
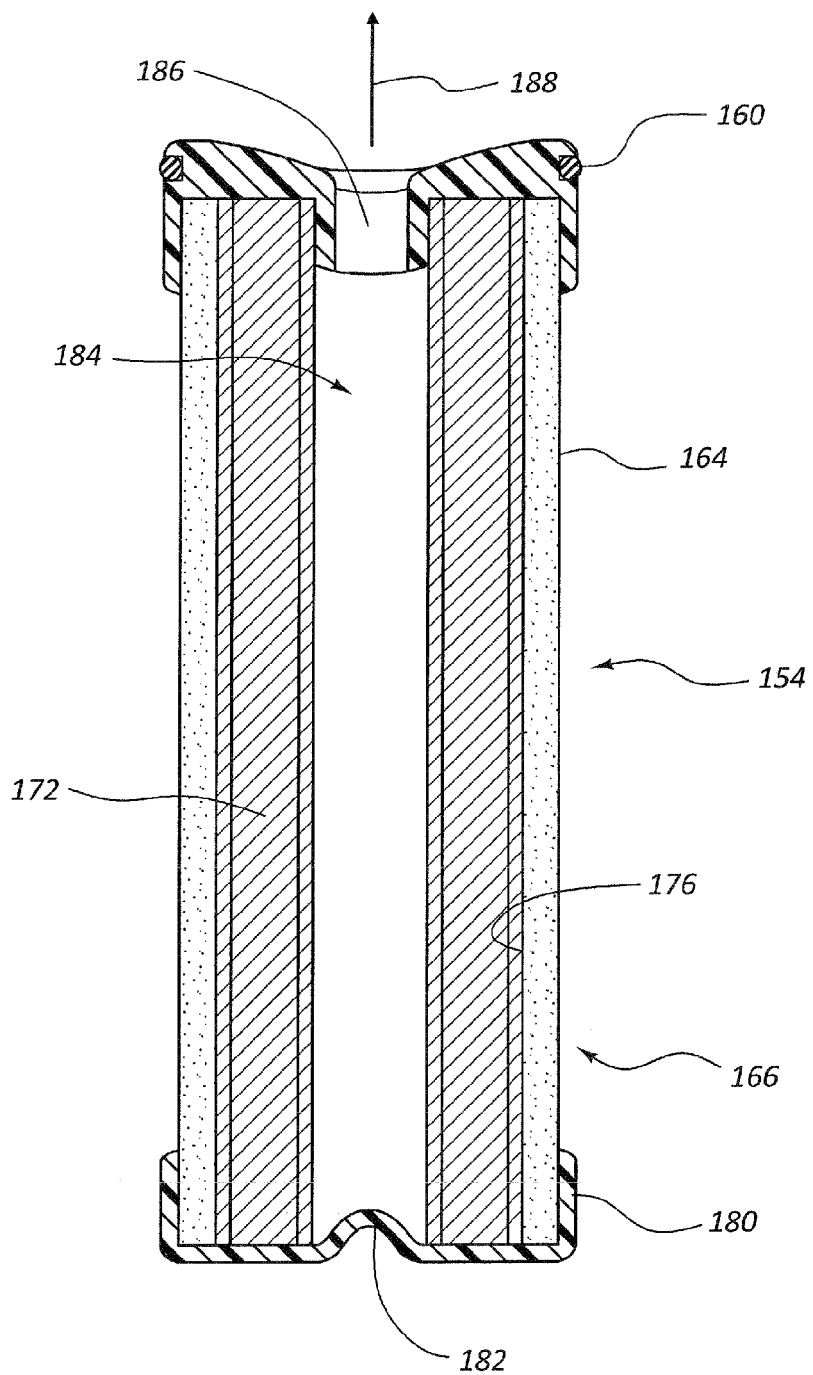
FIG. 10 is a cross sectional view of a filter cartridge in FIGS. 8 and 9.

FIGS. 8-10 show a filter assembly 148 having a cylindrical housing 150. The housing 150 has a height 151 and diameter 152 sized to receive a filter cartridge 154 that has a height 155 and a diameter selected so that the cartridge 154 slides into the interior 157 of the housing 150 and extends out a distance to engage the housing top 158 with a sealing 'O' ring 160 when the housing top 158 is installed over the housing 150. The housing top 158 is sized for a removable sealing fit over the housing 150. The sealing fit can be effected by, for example, inter active threads, a 'O' ring, a force fit and other mechanical arrangements as may be desired to effect a sealed connection. Fluid, like water 162, is directed into the housing 150 where it passes toward and through the side wall 164 of the adsorptive filter media (AFM) 166 as discussed hereinafter. The water 162 then passes to the mechanical filter medium 172 and then out the filter cartridge 154 toward the housing top 158 and out the housing spout 170.

As better seen in FIG. 9, the filter cartridge 154 has an adsorptive filter media (AFM) 166 that forms the side wall 164 of the filter cartridge 154 similar to the AFM 14. The mechanical filter media (MFM) 172 is shown in FIG. 9 separated from the AFM 166 and sized to fit within the interior 174 of the AFM 166 that is defined by the side wall 164 of the AFM 166. The MFM 172 is sized similar to the MFM 14 to be over sized so that it springs outwardly and is thereby urged in place without the need for a cage (like cage 210 and 222) and a core (like core 208) or any other comparable structures to hold the MFM 172 upright and in place.

FIG. 10 shows the filter cartridge 154 in cross section taken at 10-10 in FIG. 8 taken along axis 176. FIG. 10 shows the filter cartridge 154 with a central passage 184. The AFM 166 is shown as a structurally rigid side wall 164 with the MFM 172 therein. The MFM 172 has a plurality of pleats 178 that are compressed before the MFM 172 is inserted into the interior 174 of the AFM 166 and which spring out urging it against the interior 176 of the side wall 164. A bottom seal 180 is shown secured to the AFM 166 and the MFM 172 with a centering button 182 to register with the central channel 184. The central channel 184 registers with an exit port 186 that communicates with the housing spout 170 so that filtered fluid 188 may be transmitted and used as desired.

Figure 11:
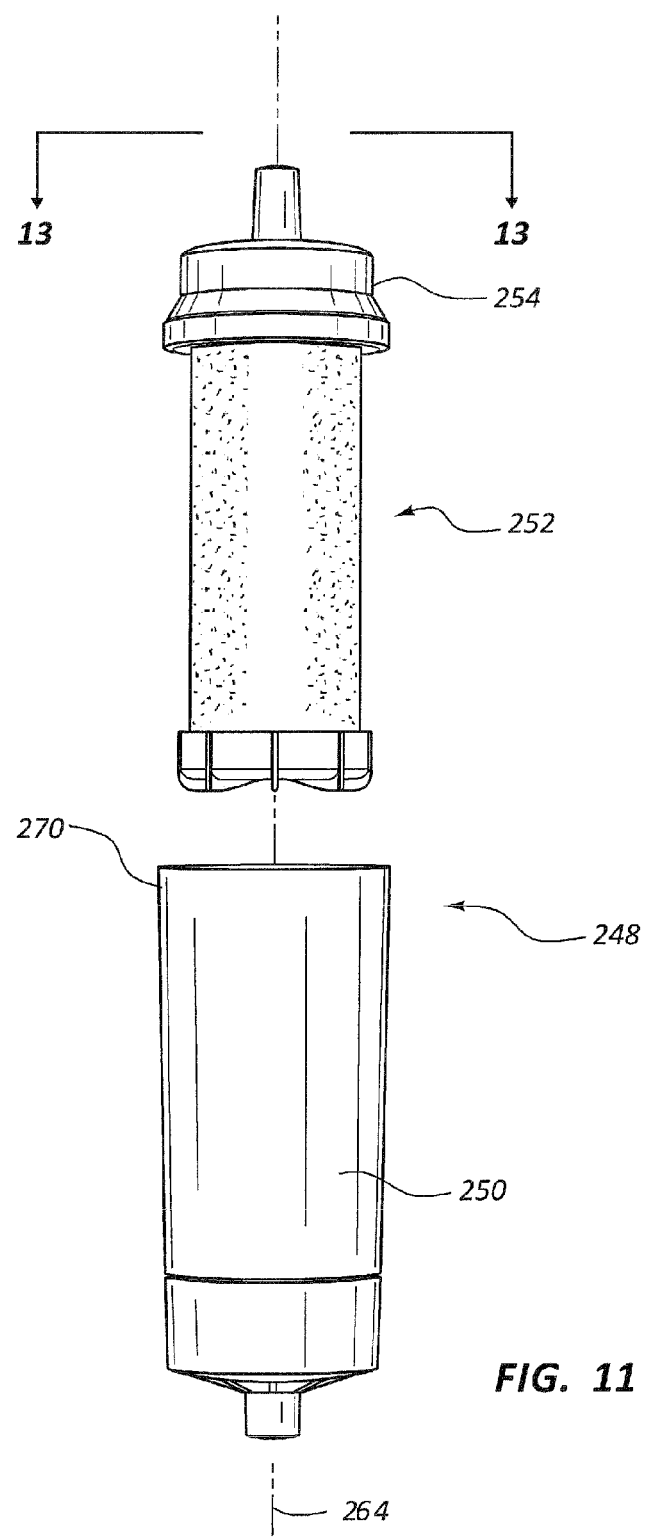
FIG. 11 is an exploded perspective view of another embodiment of the disclosed filter.
Figure 12:
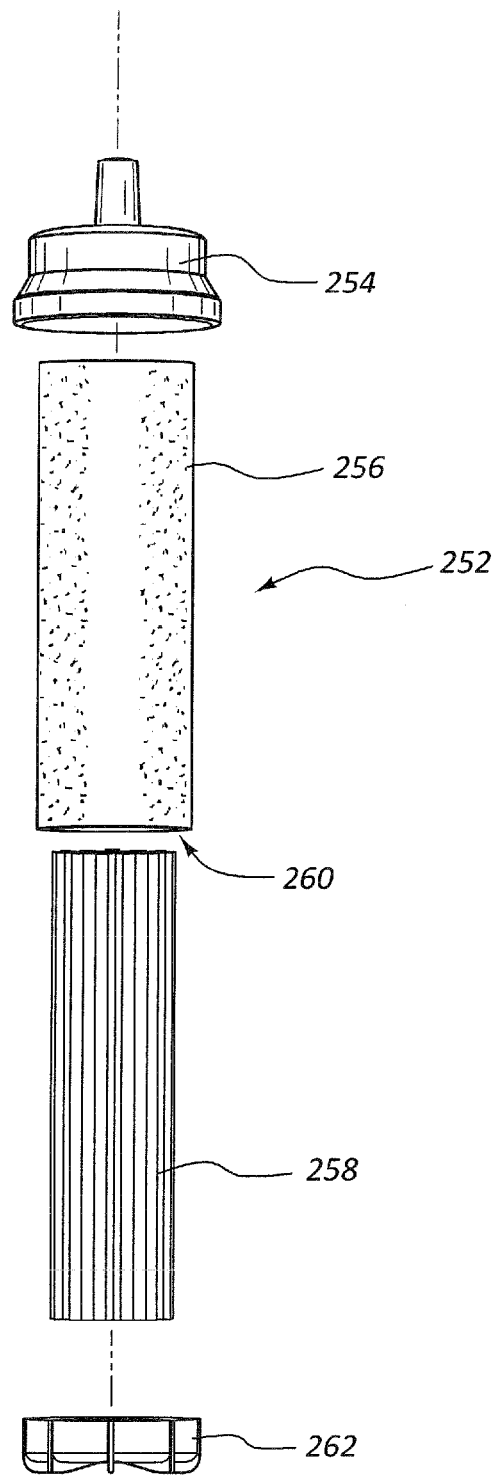
FIG. 12 is an exploded perspective view of a filter cartridge for use in the embodiment of FIG. 11.
Figure 13:
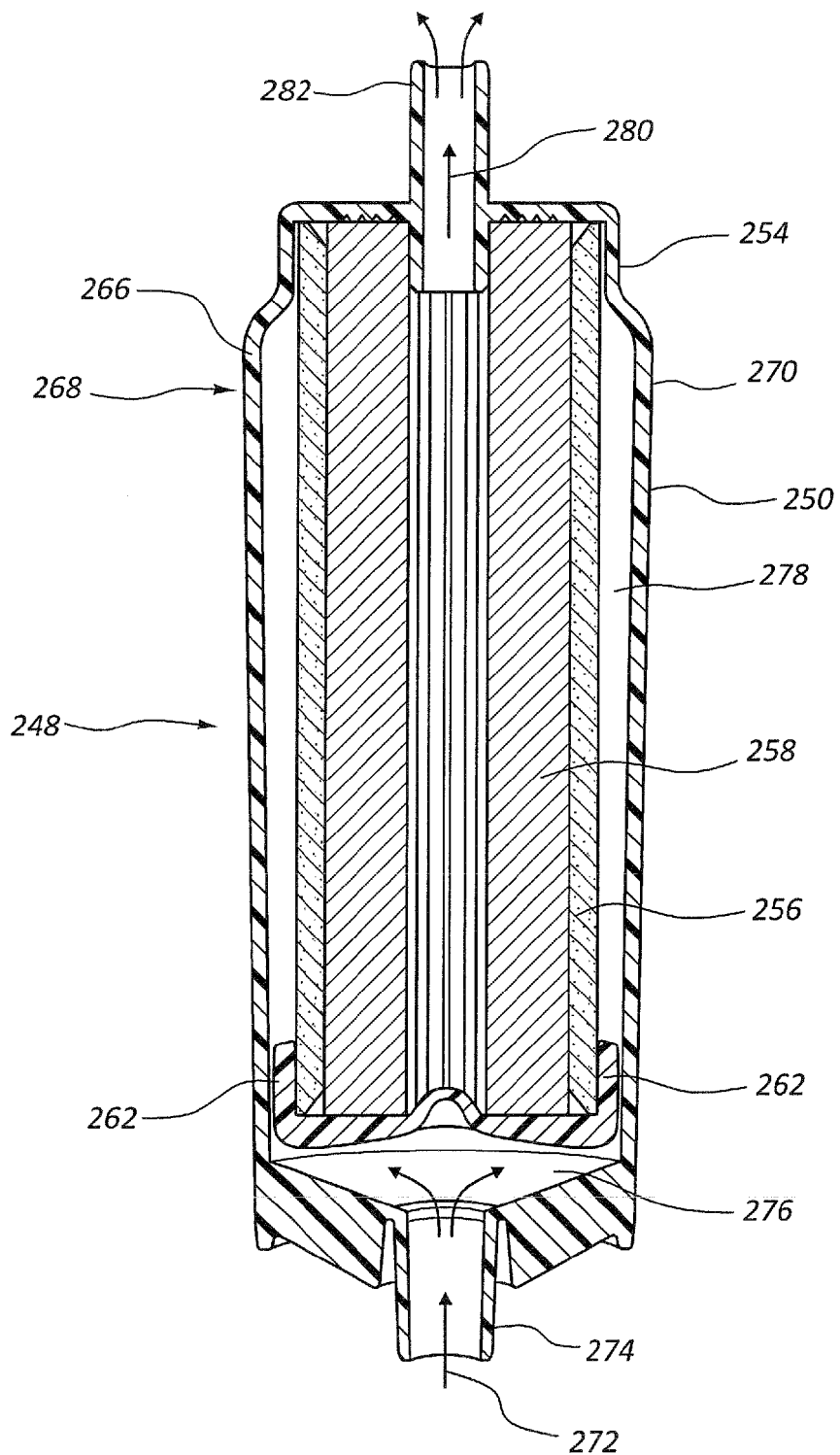
FIG. 13 is a cross sectional view of a filter cartridge in FIGS. 11 and 12.

FIGS. 11-13 show another embodiment of a filter assembly 248 in which a housing 250 is cylindrical and sized to receive a filter cartridge 252 having a housing top 254 affixed thereto as discussed hereinafter. The filter cartridge 252 is better seen in FIG. 12 with an adsorptive filter media (AFM) 256 formed to be rigid and function as a side wall with a mechanical filter medium (MFM) 258 over sized and collapsible to fit into the space 260 defined by the AFM 256 as better seen in FIG. 13. The seal cap 262 is made of a suitable plastic, like polypropylene, and is attached to the AFM 256 and the MFM 258. It may be attached by using hot melt adhesive as discussed in connection with FIGS. 3-7A or by heating the seal cap 262 to a temperature in which the seal cap starts to soften. The seal cap 262 is then pressed into position so that the AFM 256 and the MFM 258 are urged slightly into the soft plastic sufficient to effect a seal. The housing top 254 also functions as an end cap. The housing top 254 is also made of polypropylene and is also secured by hot melt or heated until it softens so that the AFM 256 and the MFM 258 are urged in to the softened polypropylene before it hardens sufficient to effect a seal.

As best seen in FIG. 13, the assembled filter assembly 248 of FIG. 11 is shown in cross section taken along lines 13-13 on the axis 264. The housing top 254 is shown with a shoulder 266 that is configured to register with a shoulder 268 formed at the top 270 of the housing 250. The housing top 254 is sized so that it mates with the housing 250 where each can be glued or welded to each other to effect a permanent connection. When so connected, fluid, e.g., water 272, enters through a port 274 into a receiver 276 under the filter cartridge 252 and past the seal cap 262 into a plenum 278 where it passes through the porous AFM 256 and from the AFM 256 into the MFM 258. The water then enters the central channel of the MFM 258, where it becomes filtered water 280 that exits the filter cartridge 252 and the filter assembly 248 through the discharge spout 282. Inasmuch as the housing 250 and the housing top 254 are sealed together, the filter cartridge cannot be readily changed and so the filter assembly may said to be disposable.

Figure 1:
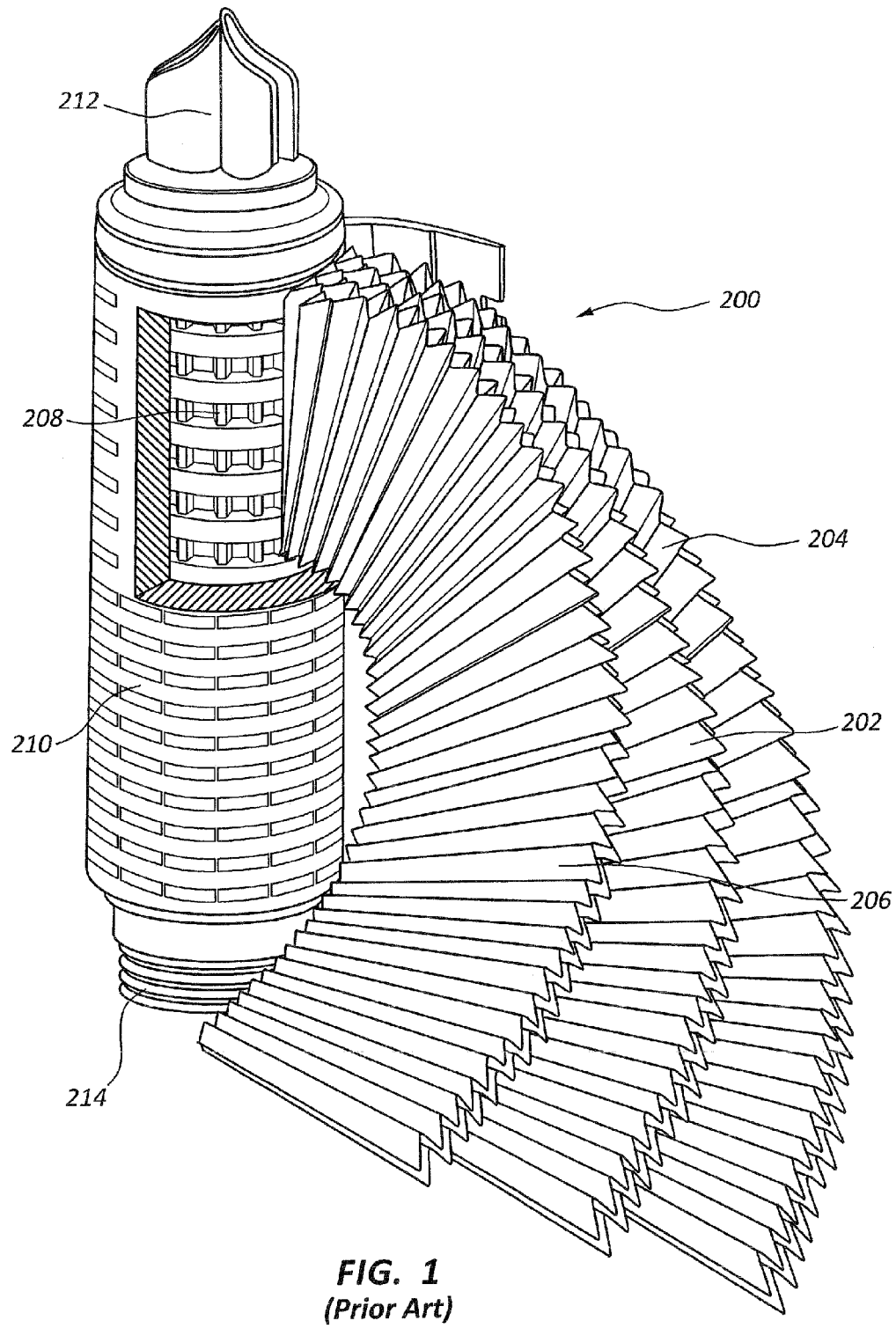
FIG. 1 is a perspective depiction with a cut away portion of a prior art filter.

It should be noted that in the assembly of FIG. 3, FIG. 9 and FIG. 12, the mechanical filters 14, 172 and 258 are all supported by a structurally rigid AFM 12, AFM 154 and AFM 256 so that no other supports are needed or desired. Thus the filter can be made simply and economically without the need for a core or a cage, such as core 208 and cage 210 as seen in FIG. 1. Thus, a filter is more versatile and may be made into non replaceable and replaceable versions.

It should be understood that many changes, modifications, variations and other uses and applications will become apparent to those skilled in the art after considering the specification and the accompanying drawings. Therefore, any and all such changes, modifications, variations and other uses and applications which do not depart from the spirit and scope of the invention are deemed to be covered by the invention.

I claim:

1. A filter for filtering contaminants in a fluid from a fluid source, said filter comprising:
   an adsorptive filter medium (AFM) having an AFM length, an AFM first end, an AFM second end, a wall having an exterior surface positioned to receive said fluid unimpeded and with substantial even pressure from said fluid source and an interior surface opposite said exterior surface, said wall being formed of a material which has a first porosity to pass said fluid therethrough while inhibiting the passage of first selected contaminants therethrough, said wall being formed of material selected to function as the exoskeleton of said filter, said wall having a thickness between said exterior surface and said interior surface which thickness in combination with said first porosity is selected to regulate the time the fluid is in contact with said filter and the flow rate of fluid moving therethrough at a preselected pressure at the exterior surface, and said wall being formed with said interior surface oriented to define a chamber;

a mechanical filtering medium (MFM) having a MFM length substantially the same as the AFM length, said MFM being positioned in said chamber and supported by said AMF and positioned to receive said fluid from said AFM, and said MFM being formed of a nonrigid and pleated material which has an electro positive charge which has a second porosity that is different from said first porosity selected for allowing said fluid to flow therethrough while inhibiting the passage of second selected contaminants therethrough and which in combination with said AFM are effective to remove viral contaminants in said fluid, and said MFM being shaped to define a central passage into which said fluid flows to form filtered fluid;

an end cap sized to sealingly attach to one of said AFM first end and said AFM second end;

an outlet aperture formed in said end cap to be in communication with said central passage, said outlet aperture being sized for the passage of said filtered fluid to the exterior of said filter;

a seal cap sized to sealingly attach to the other of said first end and said second end of said AFM; and sealing material for sealing said AFM and said MFM to and between said end cap and said seal cap.

2. A filter for filtering contaminants in a fluid from a fluid source, the filter comprising:

an adsorptive filter medium (AFM) having AFM length, an AFM first end, an AFM second end, a wall having an exterior surface positioned to receive said fluid from said fluid source and a useable interior surface opposite said exterior surface, said wall being formed of a material having a first porosity to control the flow of fluid therethrough and to evenly diffuse the flow of said fluid across said useable inside surface area of said AFM and with pores selected to inhibit the passage of first contaminants therethrough, said AFM being formed of a material having sufficient rigidity to function as the exoskeleton of the filter, said wall having a thickness between said exterior surface and said interior surface which thickness, in combination with said first porosity, is selected to regulate the time the fluid is in contact with said filter and the flux rate of fluid moving therethrough, and said AFM being formed with said useable interior surface oriented to define a chamber, said AFM being sized for positioning in a chamber configured to receive said fluid without structure proximate said exterior surface;

a mechanical filtering medium (MFM) having a MFM length substantially the same as said AFM length, said MFM being positioned in said chamber to receive fluid from said AFM, and said MFM being formed of a nonrigid material having a second porosity different from the first porosity for allowing fluid to flow therethrough while inhibiting the passage of second contaminants therethrough, said MFM having a plurality of pleats each having an outer crease, said MFM being sized to urge pleats against said interior surface to support said pleats and said MFM and said MFM defining a central passage into which said fluid flows to form filtered fluid;

an end cap sized to sealingly attach to one of said AFM first end and said AFM second end;

an outlet aperture formed in said end cap to be in communication with said central passage, said outlet aperture being sized for the passage of said filtered fluid to the exterior of said filter;

a seal cap sized to sealingly attach to the other said first end and said second end of said AFM; and sealing material for sealing said AFM and said MFM to and between said end cap and said seal cap.

3. The filter of claim 2, wherein said porosity of AFM is from about 0.3 microns to about 10 microns when the fluid is at a pressure from about 1 pound per square inch to about 10 pounds per square inch.

4. The filter of claim 2, wherein said AFM is formed and sized to have a flow rate of about 1000 cubic centimeters per minute to about 10,000 cubic centimeters per minute.

5. The filter of claim 2, wherein said sealing material is hot melt adhesive.

6. The filter of claim 2, wherein said AFM is substantially cylindrical in shape.

7. The filter of claim 2 wherein said MFM has a plurality of pleats and a first end and a second end that are sealed to each other.

8. The filter of claim 7 wherein first end and said second end are sealed to each other with hot melt adhesive.

9. A method of manufacturing a filter system to filter a fluid coming from a fluid source containing contaminants including first selected contaminants and second selected contaminants, said method comprising:

providing an adsorptive filter medium (AFM) having an AFM length, an AFM first end, an AFM second end, a wall having an exterior surface positioned to receive said fluid from said fluid source evenly over said exterior surface and an interior surface opposite said exterior surface, said wall being formed of a material which has a first porosity to pass said fluid therethrough while inhibiting the passage of said first selected contaminants therethrough, said wall being formed of material selected to function as the exoskeleton of said filter, said wall being formed with said interior surface oriented to define a chamber, said first porosity being selected to be from about 0.1 to about 0.8;

providing a mechanical filtering medium (MFM) having a MFM length substantially the same as said AFM length, said MFM being positioned in said chamber to receive said fluid from said AFM, said MFM being formed of a nonrigid material which has a second porosity that is different from said first porosity for allowing said fluid to flow therethrough while inhibiting the passage of said second selected contaminants therethrough, said MFM having a plurality of pleats each having an outer crease, said MFM being sized to urge crease against said interior surface to support said pleats and said MFM and said MFM being shaped to define a central passage into which said fluid flows to form filtered fluid;

providing an end cap sized for sealing attachment to one of said AFM first end and said AFM second end;

forming an outlet aperture in said end cap to be in communication with said central passage, said outlet aperture being sized for the passage of said filtered fluid to the exterior of said filter;

providing a seal cap sized to sealingly attach to the other of said AFM first end and said AFM second end;

placing said MFM in said chamber;

adhering the MFM to a one of said end cap and said seal cap to seal the fluid space from the center channel; and bonding the other of said end cap and said seal cap to said MFM to substantially seal the chamber from the fluid source.

10. The method of claim 9, wherein said MFM has a first end and a second end, wherein a first thermoplastic is provided and heated to be a liquid hot melt; wherein said first end and said second end are placed in contact and then in said liquid hot melt to join.

11. The method of claim 9, wherein said sealing material is hot melt adhesive.

12. The method of claim 9, further comprising:
analyzing the fluid source to identify the contaminants in the fluid source; and
varying the composition of one of the AFM and the MFM to filter the identified contaminants.

13. The method of claim 12 wherein said AFM is made of one element selected from a group consisting of one of an adsorption material, a combination of adsorption materials, a polymer matrix of the adsorption filtering medium, and a mechanical filtering material.

14. A filter assembly for filtering a fluid from a fluid source, the filter comprising:
a housing having a fluid space, a fluid entrance port to receive said fluid from said fluid source and to communicate said fluid to said fluid space and a fluid exit port in communication with said fluid space and configured to transmit fluid away from said filter assembly;
a filter separate from said housing and sized and configured for positioning in said housing, said filter including
an adsorptive filter medium (AFM) having an AFM length, an AFM first end, an AFM second end, said AFM forming and defining a wall having an exterior surface positioned to receive said fluid from said fluid source without structure modifying the flow of fluid into and over said exterior surface of said AFM and an interior surface opposite said exterior surface, said wall being formed of a material which has a first porosity to pass said fluid therethrough while inhibiting the passage of first selected contaminants therethrough, said wall being formed of material having structural strength selected to function as the exoskeleton of said filter, and said wall being formed with said interior surface oriented to define a chamber;
a mechanical filtering medium (MFM) having a MFM length substantially the same as the AFM length, said MFM being positioned in said chamber to receive said fluid from said AFM, and said MFM being formed of a nonrigid material which has a second porosity that is different from said first porosity for allowing said fluid to flow therethrough while inhibiting the passage of second selected contaminants therethrough, and said MFM being shaped to define a central passage into which said fluid flows to form filtered fluid;
an end cap coupled to said fluid exit port for the passage of filtered fluid from said central passage out said fluid exit port; and
a seal cap coupled to the other end of said mechanical filtering medium to substantially seal the center channel from the fluid space.

15. The filter assembly of claim 14, wherein the adsorption filtering medium is formed of at least one adsorption filtering material selected to filter a particular contaminant.

16. The filter assembly of claim 14, wherein the mechanical filtering medium is pleated.

17. The filter system of claim 15, wherein the mechanical filtering medium exerts a radial pressure on the interior surface of the adsorption filtering medium.

18. The filter system of claim 14 wherein the absorptive filtering medium is formed with a defined porosity to control the flow of fluid within a specified range at a specified inlet fluid pressure.

19. The filter system of claim 17 wherein said AFM constructed so as to evenly diffuse the flow of liquid across the entire usable inside surface area of the AFM.

20. A method of manufacturing a filter system without a surrounding housing or cage, said filter system being configured to filter a fluid coming from a fluid source containing contaminants including first selected contaminants and second selected contaminants, said method comprising:
providing an adsorptive filter medium (AFM) having an AFM length, an AFM first end and an AFM second end, a wall having an exterior surface positioned to receive said fluid from said fluid source over said exterior surface of said AFM and a useable interior surface opposite said exterior surface, said wall being the exoskeleton of said filter, said wall being formed of a material having a porosity selected to control the flow of fluid, to filter selected contaminants and to evenly diffuse the flow of said fluid across the entire usable inside surface area, and said wall being formed with said useable interior surface oriented to define a chamber;
providing a mechanical filtering medium (MFM) having a MFM length substantially the same as the AFM length, said MFM having an MFM first end and an MFM second end, said MFM being positioned in said chamber, said MFM being formed of a nonrigid material which is porous allowing fluid to flow therethrough while inhibiting the passage of selected contaminants therethrough, and said MFM defining a central passage into which said fluid flows to form filtered fluid, and said MFM is made of material in combination with said AFM are effective to remove viral contaminants in said fluid at a preselected flow rate and porosity and thickness of said AFM;
providing an end cap having an inside surface and sized to sealingly attach to one of said AFM first end and said AFM second end of said AFM, said end cap having an outlet aperture in communication with said central passage, said outlet aperture being sized for the passage of said filtered fluid to the exterior of said filter;
providing a seal cap having an inside surface and sized to sealingly attach to the other of said first end and said second end of said AFM;
applying sealing material to said inside surface of said end cap and to said inside surface of said seal cap or to said one of said MFM first end and said MFM second end; and
urging said MFM first end and said MFM second end each respectively to and against one of said seal cap and said end cap and over one of said AFM first end and said AFM second end to form said chamber.

\* \* \* \* \*